(12) United States Patent
Dubreuil

(10) Patent No.: US 11,035,293 B2
(45) Date of Patent: Jun. 15, 2021

(54) REVERSE FLOW GAS TURBINE ENGINE WITH OFFSET RGB

(71) Applicant: PRATT & WHITNEY CANADA CORP., Longueuil (CA)

(72) Inventor: Jean Dubreuil, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 515 days.

(21) Appl. No.: 15/407,401

(22) Filed: Jan. 17, 2017

(65) Prior Publication Data

US 2018/0073429 A1    Mar. 15, 2018

Related U.S. Application Data

(63) Continuation-in-part of application No. 15/266,321, filed on Sep. 15, 2016.

(51) Int. Cl.
*F02C 3/107* (2006.01)
*F02C 6/20* (2006.01)
(Continued)

(52) U.S. Cl.
CPC ............. *F02C 3/107* (2013.01); *F02C 3/145* (2013.01); *F02C 6/206* (2013.01); *F02C 7/32* (2013.01);
(Continued)

(58) Field of Classification Search
CPC .......... F02C 7/36; F02K 3/06; F05D 2230/70; F05D 2230/72; F05D 2260/40311; B64D 2033/0293
See application file for complete search history.

(56) References Cited

U.S. PATENT DOCUMENTS 2,548,975 A    4/1951    Awthorne
2,747,367 A    5/1956    Savin
(Continued)

FOREIGN PATENT DOCUMENTS

CA        2562290 C    10/2013
CA        2970386       1/2018
(Continued)

OTHER PUBLICATIONS

United Training Corp., PT6 Descriptive Course and Guide To Troubleshooting, Dec. 2016, Pub: United Training Corp., pp. 5, 21, and 23. (Year: 2016).*
(Continued)

*Primary Examiner* — Ehud Gartenburg
*Assistant Examiner* — Henry Ng
(74) *Attorney, Agent, or Firm* — Norton Rose Fulbright Canada LLP

(57) ABSTRACT

A gas turbine engine has an engine case housing a low pressure compressor drivingly connected to a low pressure turbine by a low pressure compressor shaft extending along an engine axis. The low pressure turbine is disposed forward of the low pressure compressor. A low pressure turbine shaft is drivingly connected to the low pressure turbine and extends forwardly of the low pressure turbine. A reduction gear box (RGB) is drivingly connected to the low pressure turbine shaft. The RGB is offset from the engine axis to free an access to low pressure compressor shaft connection. The offset positioning of the RGB allows to provide an access port in an axially forwardly facing surface of the engine case to access the low pressure compressor shaft and more particularly a connection thereof to the low pressure turbine.

15 Claims, 1 Drawing Sheet

(51) Int. Cl.
*F02C 3/14* (2006.01)
*F02C 7/32* (2006.01)
*F02C 7/36* (2006.01)

(52) U.S. Cl.
CPC .......... *F02C 7/36* (2013.01); *F05D 2220/324* (2013.01); *F05D 2220/329* (2013.01); *F05D 2220/76* (2013.01); *F05D 2260/53* (2013.01); *Y02T 50/60* (2013.01)

(56) References Cited

U.S. PATENT DOCUMENTS

| | | | |
|---|---|---|---|
| 2,929,207 A | 3/1960 | Peterson | |
| 2,955,424 A | 10/1960 | Ryniszak | |
| 2,984,977 A | 5/1961 | Embree | |
| 3,152,443 A | 10/1964 | Newland | |
| 3,170,292 A | 2/1965 | Howes | |
| 3,204,406 A | 9/1965 | Howes | |
| 3,209,536 A | 10/1965 | Howes | |
| 3,255,825 A | 6/1966 | Mouille et al. | |
| 3,488,947 A | 1/1970 | Miller | |
| 3,529,419 A | 9/1970 | Reed | |
| 3,762,161 A | 10/1973 | Pennig | |
| 3,874,811 A * | 4/1975 | Dennison | F01D 25/162 |
| | | | 415/60 |
| 4,055,949 A | 11/1977 | Boudigues | |
| 4,141,212 A | 2/1979 | Koschier | |
| 4,251,987 A | 2/1981 | Adamson | |
| 4,498,291 A | 2/1985 | Jefferey | |
| 4,531,694 A | 7/1985 | Soloy | |
| 4,611,464 A | 9/1986 | Hetzer et al. | |
| 4,617,028 A * | 10/1986 | Ray | F02C 7/05 |
| | | | 55/306 |
| 4,685,286 A | 8/1987 | Etzer et al. | |
| 4,815,282 A | 3/1989 | Wilkinson et al. | |
| 4,817,382 A | 4/1989 | Rudolph et al. | |
| 4,864,812 A | 9/1989 | Rodgers | |
| 5,119,624 A | 6/1992 | McKenna | |
| 5,159,808 A | 11/1992 | Kast | |
| 5,161,364 A | 11/1992 | Bruun | |
| 5,309,708 A | 5/1994 | Stewart | |
| 5,483,791 A * | 1/1996 | Kotwal | F02C 7/04 |
| | | | 137/15.1 |
| 6,041,589 A | 3/2000 | Giffin, III et al. | |
| 6,082,967 A | 7/2000 | Loisy | |
| 6,247,668 B1 | 6/2001 | Reysa | |
| 6,735,954 B2 | 5/2004 | MacFarlane et al. | |
| 6,855,089 B2 | 2/2005 | Poulin | |
| 6,865,891 B2 | 3/2005 | Walsh et al. | |
| 6,895,741 B2 | 5/2005 | Rago et al. | |
| 6,901,759 B2 | 6/2005 | Frutschi | |
| 6,990,798 B2 * | 1/2006 | Bouchard | F02C 7/04 |
| | | | 60/269 |
| 7,055,303 B2 | 6/2006 | Macfarlane et al. | |
| 7,144,349 B2 | 12/2006 | Mitrovic | |
| 7,168,913 B2 | 1/2007 | Lardellier | |
| 7,500,365 B2 | 3/2009 | Suciu et al. | |
| 7,552,591 B2 | 6/2009 | Bart | |
| 7,690,185 B2 | 4/2010 | Linet et al. | |
| 7,698,884 B2 | 4/2010 | Maguire et al. | |
| 7,707,909 B2 | 5/2010 | Linet et al. | |
| 7,758,302 B2 | 7/2010 | Linet et al. | |
| 7,762,084 B2 | 7/2010 | Martis | |
| 8,176,725 B2 | 5/2012 | Norris | |
| 8,209,952 B2 | 7/2012 | Ress, Jr. | |
| 8,220,245 B1 | 7/2012 | Papandreas | |
| 8,350,398 B2 | 1/2013 | Butt | |
| 8,459,038 B1 | 6/2013 | Lickfold | |
| 8,464,511 B1 | 6/2013 | Ribarov et al. | |
| 8,500,583 B2 | 8/2013 | Goi et al. | |
| 8,516,789 B2 | 8/2013 | Kupratis | |
| 8,568,089 B2 | 10/2013 | Lemmers, Jr. et al. | |
| 8,621,871 B2 | 1/2014 | McCune et al. | |
| 8,794,922 B2 | 8/2014 | Bart et al. | |
| 8,853,878 B1 | 10/2014 | White | |
| 9,062,611 B2 | 6/2015 | Sheridan | |
| 9,126,691 B2 * | 9/2015 | Cloft | B64D 29/08 |
| 9,145,834 B2 | 9/2015 | Frost et al. | |
| 9,239,004 B2 | 1/2016 | Kupratis | |
| 9,297,305 B2 | 3/2016 | Drachsler et al. | |
| 9,322,341 B2 | 4/2016 | Belleville | |
| 9,328,667 B2 | 5/2016 | MacFarlane | |
| 9,341,121 B2 | 5/2016 | Kupratis | |
| 9,353,848 B2 | 5/2016 | Blewett et al. | |
| 9,512,784 B2 | 12/2016 | Morgan et al. | |
| 9,828,911 B2 | 1/2017 | Burghardt | |
| 9,719,465 B2 | 8/2017 | Suciu | |
| 9,745,860 B1 | 8/2017 | Haskin | |
| 9,752,500 B2 | 9/2017 | Ullyott | |
| 9,784,182 B2 | 10/2017 | Dhanuka | |
| 9,819,292 B2 | 11/2017 | Thatcher | |
| 9,890,704 B2 | 2/2018 | Speak et al. | |
| 9,926,849 B2 | 3/2018 | Frost et al. | |
| 9,932,858 B2 | 4/2018 | Miller | |
| 10,054,001 B2 | 8/2018 | Beutin et al. | |
| 10,072,570 B2 | 9/2018 | Kupratis | |
| 10,094,295 B2 | 10/2018 | Ullyott et al. | |
| 10,125,722 B2 | 11/2018 | Kupratis | |
| 2005/0060983 A1 | 3/2005 | Lardellier | |
| 2006/0010152 A1 | 1/2006 | Catalano | |
| 2006/0137355 A1 | 6/2006 | Welch et al. | |
| 2007/0240427 A1 | 10/2007 | Ullyott | |
| 2008/0081733 A1 | 4/2008 | Hattenbach | |
| 2008/0138195 A1 | 6/2008 | Kern | |
| 2008/0148881 A1 | 6/2008 | Moniz et al. | |
| 2009/0015011 A1 | 1/2009 | Colin | |
| 2009/0188334 A1 | 7/2009 | Merry | |
| 2009/0288421 A1 | 11/2009 | Zeiner | |
| 2009/0322088 A1 | 12/2009 | Dooley | |
| 2010/0164234 A1 | 7/2010 | Bowman | |
| 2010/0180568 A1 | 7/2010 | Sachs | |
| 2010/0212285 A1 | 8/2010 | Negulescu | |
| 2010/0219779 A1 * | 9/2010 | Bradbrook | F02C 7/32 |
| | | | 318/153 |
| 2010/0281875 A1 | 11/2010 | Price | |
| 2011/0056208 A1 | 3/2011 | Norris | |
| 2011/0142648 A1 * | 6/2011 | Swift | F02C 6/206 |
| | | | 416/162 |
| 2011/0171030 A1 * | 7/2011 | Swift | F01D 7/00 |
| | | | 416/159 |
| 2011/0284328 A1 | 11/2011 | Brandt | |
| 2013/0031912 A1 | 2/2013 | Finney | |
| 2013/0056982 A1 | 3/2013 | Gozdawa | |
| 2013/0098066 A1 | 4/2013 | Gallet | |
| 2013/0139518 A1 | 6/2013 | Morgan | |
| 2013/0145769 A1 | 6/2013 | Norris | |
| 2013/0186058 A1 | 7/2013 | Sheridan | |
| 2013/0255224 A1 * | 10/2013 | Kupratis | F02C 6/02 |
| | | | 60/226.1 |
| 2014/0069107 A1 | 3/2014 | Macfarlane | |
| 2014/0130352 A1 | 5/2014 | Buldtmann et al. | |
| 2014/0150401 A1 | 6/2014 | Venter | |
| 2014/0250862 A1 | 9/2014 | Suciu et al. | |
| 2014/0252160 A1 | 9/2014 | Suciu et al. | |
| 2014/0255147 A1 | 9/2014 | Root | |
| 2014/0256494 A1 | 9/2014 | Lewis | |
| 2014/0260295 A1 | 9/2014 | Ullyott | |
| 2014/0290265 A1 | 10/2014 | Ullyott | |
| 2014/0297155 A1 | 10/2014 | Chen | |
| 2015/0000304 A1 * | 1/2015 | Lindsey | F02C 7/04 |
| | | | 60/792 |
| 2015/0013307 A1 | 1/2015 | Burghardt | |
| 2015/0150401 A1 | 6/2015 | Venter | |
| 2015/0167549 A1 | 6/2015 | Ribarov | |
| 2015/0337738 A1 | 11/2015 | Suciu | |
| 2015/0369123 A1 | 12/2015 | Hanrahan | |
| 2015/0377125 A1 | 12/2015 | Kupratis | |
| 2016/0040601 A1 | 2/2016 | Frost | |
| 2016/0090871 A1 | 3/2016 | Olsen | |
| 2016/0169118 A1 | 6/2016 | Duong | |
| 2016/0201490 A1 | 7/2016 | Scott | |
| 2016/0208690 A1 | 7/2016 | Limmitti | |
| 2016/0215694 A1 | 7/2016 | Brostmeyer | |
| 2016/0230843 A1 | 8/2016 | Duong et al. | |

(56) References Cited

U.S. PATENT DOCUMENTS

| | | | |
|---|---|---|---|
| 2016/0245185 A1 | 8/2016 | Lamarre et al. | |
| 2016/0290226 A1 | 10/2016 | Roberge | |
| 2016/0305261 A1 | 10/2016 | Orosa | |
| 2016/0319845 A1* | 11/2016 | Molnar | F04D 29/668 |
| 2016/0333791 A1 | 11/2016 | Snyder et al. | |
| 2016/0341214 A1 | 11/2016 | O'Toole | |
| 2016/0363055 A1 | 12/2016 | Edwards | |
| 2017/0108084 A1 | 4/2017 | Chmylkowski | |
| 2017/0122122 A1 | 5/2017 | Lepretre | |
| 2017/0211477 A1 | 7/2017 | Menheere | |
| 2017/0211484 A1 | 7/2017 | Sheridan | |
| 2017/0191413 A1 | 8/2017 | Raskin | |
| 2017/0306841 A1 | 10/2017 | Skertic | |
| 2017/0314469 A1 | 11/2017 | Roever | |
| 2017/0314474 A1* | 11/2017 | Wotzak | F02C 7/32 |
| 2017/0327241 A1 | 11/2017 | Mitrovic | |
| 2017/0356347 A1 | 12/2017 | Scothern et al. | |
| 2017/0356452 A1 | 12/2017 | Mastro | |
| 2017/0370284 A1 | 12/2017 | Harvey | |
| 2018/0016989 A1 | 1/2018 | Abe | |
| 2018/0023481 A1 | 1/2018 | Lefebvre | |
| 2018/0023482 A1 | 1/2018 | Lefebvre | |
| 2018/0045068 A1 | 2/2018 | Brinson et al. | |
| 2018/0058330 A1* | 3/2018 | Munevar | F02C 7/275 |
| 2018/0073428 A1 | 3/2018 | Morgan | |
| 2018/0073429 A1 | 3/2018 | Dubreuil | |
| 2018/0073438 A1 | 3/2018 | Durocher et al. | |
| 2018/0128183 A1* | 5/2018 | Escure | B64D 35/06 |
| 2018/0135522 A1 | 5/2018 | Mitrovic et al. | |
| 2018/0149091 A1 | 5/2018 | Howell et al. | |
| 2018/0163640 A1 | 6/2018 | Dubreuil | |
| 2018/0171815 A1 | 6/2018 | Suciu et al. | |
| 2018/0172012 A1 | 6/2018 | Plante | |
| 2018/0202310 A1 | 7/2018 | Suciu et al. | |
| 2018/0202368 A1 | 7/2018 | Suciu et al. | |
| 2018/0208322 A1 | 7/2018 | Tantot | |
| 2018/0216525 A1 | 8/2018 | Plante et al. | |
| 2018/0223739 A1 | 8/2018 | Dubreuil et al. | |
| 2018/0283281 A1 | 10/2018 | Veilleux, Jr. et al. | |
| 2018/0291817 A1 | 10/2018 | Suciu et al. | |
| 2018/0313274 A1 | 11/2018 | Suciu et al. | |
| 2018/0347471 A1 | 12/2018 | Wotzak | |

FOREIGN PATENT DOCUMENTS

| | | |
|---|---|---|
| CA | 2970389 | 1/2018 |
| CA | 2975558 | 6/2018 |
| EP | 0103370 | 3/1984 |
| EP | 0860593 B1 | 9/2003 |
| EP | 1908938 | 4/2004 |
| EP | 2226487 | 9/2010 |
| EP | 2295763 | 3/2011 |
| EP | 2320067 | 5/2011 |
| EP | 1959114 B1 | 5/2012 |
| EP | 2728140 | 5/2014 |
| EP | 3043056 | 7/2016 |
| EP | 3273031 | 1/2018 |
| EP | 3273034 | 1/2018 |
| EP | 3273032 | 4/2018 |
| EP | 3309371 | 4/2018 |
| FR | 991975 | 10/1951 |
| FR | 1262452 | 5/1961 |
| FR | 1594317 | 6/1970 |
| GB | 713839 | 8/1954 |
| GB | 1102591 | 2/1968 |
| WO | WO95/02120 A1 | 1/1995 |
| WO | 2005/061873 | 7/2005 |
| WO | WO200845068 | 4/2008 |
| WO | WO201533336 | 3/2015 |
| WO | 20150122948 | 8/2015 |
| WO | WO2015122948 | 8/2015 |
| WO | WO2017/198999 | 11/2017 |

OTHER PUBLICATIONS

A New Approach to Turboshaft Engine Growth, M. A. Compagnon, General Electric Company, Lynn,Massachusetts pp. 80-41-1 to 80-41-6, May 13, 1980.
U.S. Appl. No. 15/384,959, filed Dec. 20, 2016.
European Search Report dated Nov. 30, 2017 in related EP application No. 17182102.8.
European Search Report dated Dec. 12, 2017 in related EP application No. 17182076.4.
European Search Report dated Dec. 12, 2017 in related EP application No. 17182096.2.
European Search Report dated Jan. 31, 2018 in counterpart EP application No. 17185796.4.
European Search Report dated Mar. 19, 2018 in related EP application No. 17182087.1.
European Search Report dated Mar. 21, 2018 in related EP application No. 17182094.7.
European Search Report dated Apr. 6, 2018 in related EP application No. 17193893.9.
European Search Report dated May 25, 2018 in related EP application No. 17191309.8.
European Search Report dated May 25, 2018 in related EP application No. 17186249.3.
European Search Report dated Jul. 2, 2018 in relating EP application No. 18154161.6.

* cited by examiner

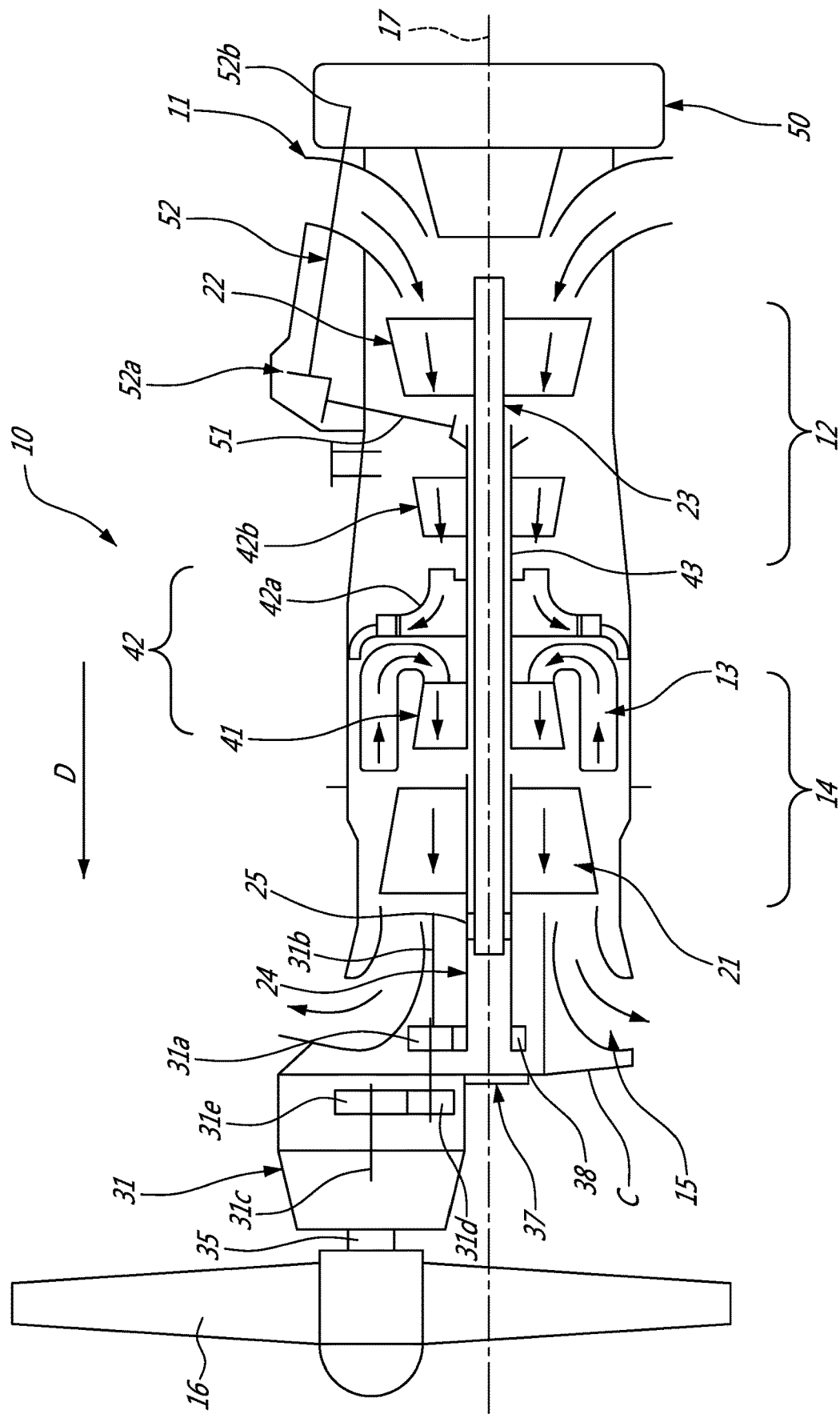

REVERSE FLOW GAS TURBINE ENGINE WITH OFFSET RGB

RELATED APPLICATION

This application claims priority from U.S. patent application Ser. No. 15/266,321 filed Sep. 15, 2016, the entire contents of which are incorporated by reference herein.

TECHNICAL FIELD

The application relates generally to gas turbine engines and, more particularly, to a reverse flow gas turbine engine architecture.

BACKGROUND OF THE ART

It is common practice to derive shaft power from gas turbine engine rotors to provide power to external equipment and drive external loads. A reduction gearbox (RGB) is typically used to provide a speed output different from the input speed of the turbine rotors. The positioning of the RGB is typically dictated by the engine architecture to the detriment of other considerations, such as compactness, engine re-configurability and component accessibility. This is particularly true in the context of a reverse flow engine architecture where gases flow from the rear to the front of the engine.

SUMMARY

In one aspect, there is provided a gas turbine engine comprising: an engine case housing a low pressure compressor drivingly connected to a low pressure turbine by a low pressure compressor shaft extending along an engine axis, the low pressure turbine disposed forward of the low pressure compressor, a low pressure turbine shaft drivingly connected to the low pressure turbine and extending forward of the low pressure turbine, a reduction gear box (RGB) drivingly connected to the low pressure turbine shaft forward of the low pressure turbine, the RGB radially offset from the engine axis, and an access port defined in an axially forwardly facing surface of the engine case, the port disposed to provide access to the low pressure compressor shaft.

In another aspect, there is provided a gas turbine engine comprising: an output drive shaft having a front end configurable to drivingly engage a rotatable load; a low pressure (LP) turbine drivingly connected to the drive shaft via a reduction gear box (RGB), an LP compressor drivingly connected to the LP turbine via an LP compressor shaft, the LP turbine disposed forward of the LP compressor; a high pressure (HP) turbine drivingly connected to an HP compressor via an HP shaft, the HP compressor disposed forward of the LP compressor and in fluid communication therewith for receiving pressurized air therefrom, the HP turbine disposed aft of the LP turbine and in fluid communication therewith; wherein the RGB is radially offset from the LP compressor shaft to provide axial access thereto via a front end of the engine.

DESCRIPTION OF THE DRAWINGS

FIG. 1 is a schematic cross-sectional view of a gas turbine engine according to an embodiment of the present disclosure.

DETAILED DESCRIPTION

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. The exemplary engine 10 includes a propeller 16 which provides thrust for flight and taxiing. The gas turbine engine 10 has a main axis 17.

The gas turbine engine 10 (sometimes referred to herein simply as "engine 10") has an engine case C housing a central core through which gases flow and which includes some of the turbomachinery of the engine 10. The engine 10 is a "reverse-flow" engine 10 because gases flow through the core from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the core of the engine 10 disclosed herein can be better appreciated by considering that the gases flow through the core in the same direction D as the one along which the engine 10 travels during flight. Stated differently, gases flow through the engine 10 from a rear end thereof towards the propeller 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

Still referring to FIG. 1, the engine 10 has multiple spools which perform compression to pressurize the air received through the air inlet 11, and which extract energy from the combustion gases before they exit the engine via the exhaust outlet 15. The illustrated embodiment comprises a low pressure (LP) spool and a high pressure (HP) spool.

The LP spool includes at least one component to compress the air that is part of the compressor section 12, and at least one component to extract energy from the combustion gases that is part of the turbine section 14. More particularly, the LP spool 20 has an LP turbine 21 which extracts energy from the combustion gases, and which is drivingly connected to an LP compressor 22 via an LP compressor shaft 23. The LP turbine 21 drives the LP compressor 22, thereby causing the LP compressor 22 to pressurize the air. Both the LP turbine 21 and the LP compressor 22 are disposed along the engine axis 17. They can each include one or more stages of rotors and stators, depending upon the desired engine thermodynamic cycle, for example.

The LP compressor shaft 23 is coaxial with the engine axis 17. The LP compressor shaft 23 allows the LP turbine 21 to drive the LP compressor 22 during operation of the engine 10. The LP compressor shaft 23 is not limited to the configuration depicted in FIG. 1, and can also mechanically couple the LP turbine 21 and the LP compressor 22 in any other suitable way provided that it transmits a rotational drive from the LP turbine 21 to the LP compressor 22. For example, the LP compressor shaft 23 can be combined with a geared LP compressor 22 to allow the LP compressor 22 to run at a different rotational speed from the LP turbine 21. This can provide more flexibility in the selection of design points for the LP compressor 22.

The LP turbine 21 is forward of the LP compressor 22. The LP turbine 21 is also aft of the exhaust outlet 15. The LP compressor 22 is forward of the air inlet 11. This arrangement of the LP turbine 21 and the LP compressor 22 provides for a reverse-flow engine 10 that has one or more low pressure compressors located at the rear of the engine 10 which are driven by one or more low pressure turbines located at the front of the engine 10.

Still referring to FIG. 1, the engine 10 includes an LP turbine shaft 24 (also referred to as a power shaft). The LP turbine shaft 24 extends forwardly from the LP turbine 21 and is drivingly engaged thereto. The LP turbine shaft 24 is distinct from the LP compressor shaft 23. According to the illustrated embodiment, the LP compressor s haft 23 is drivingly connected to the LP turbine 21 via the LP turbine shaft 24. The LP compressor shaft 23 extends into the LP turbine shaft 24 and is mechanically coupled thereto to be driven by the LP turbine 21. In the depicted embodiment, the LP turbine shaft 24 and the power shaft 23 are coaxial and interconnected. FIG. 1 shows that the LP compressor and LP turbine shafts 23,24 may be interconnected with a spline 25. The spline 25, which can include axially oriented ridges or teeth on the LP turbine shaft 24 that mesh with grooves in the LP compressor shaft 23 (or vice versa), allows for the transfer of torque between the LP turbine shaft 24 and the LP compressor shaft 23. In the depicted embodiment, the LP compressor shaft 23 lies at least partially within the LP turbine shaft 24, such that the spline 25 transfers the rotational drive or torque generated by the LP turbine 21 from the LP turbine shaft 24 to the LP compressor shaft 23. The spline connection 25 can operate so that the LP compressor shaft 23 and the LP turbine shaft 24 rotate at the same rotational speed. Other mechanical techniques can also be used to interconnect the LP compressor and the LP turbine shafts 23,24. For example, the shafts 23,24 can be interconnected by curvic coupling, pins, and interference fits. Other configurations of the LP turbine shaft 24 and the LP compressor shaft 23 are also possible.

A rotatable load, which in the embodiment shown includes the propeller 16, is mountable to the engine 10, and when mounted, is drivingly engaged (e.g. directly connected) to the LP turbine 21, and is located forward of the LP turbine 21. In such a configuration, during operation of the engine 10, the LP turbine 21 drives the rotatable load such that a rotational drive produced by the LP turbine 21 is transferred to the rotatable load. The rotatable load can therefore be any suitable component, or any combination of suitable components, that is capable of receiving the rotational drive from the LP turbine 21, as now described.

A reduction gearbox 31 (sometimes referred to herein simply as "RGB 31") is mechanically coupled to a front end of the LP turbine shaft 24, which extends between the RGB 31 and the LP turbine 21. The RGB 31 processes and outputs the rotational drive transferred thereto from the LP turbine 21 via the LP turbine shaft 24 through known gear reduction techniques. The RGB 31 allows for the propeller 16 to be driven at its optimal rotational speed, which is different from the rotational speed of the LP turbine 21.

The propeller 16 is mechanically coupled to the output of the RGB 31 via a propeller shaft 35. The propeller shaft 35 allows the rotational drive outputted by the RGB 31 during operation of the engine 10 to be transferred to the propeller 16 to provide propulsion during flight. In an alternate embodiment where the engine 10 is a turboshaft, the propeller 16 is omitted and the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine 21 via the RGB 31.

As can be appreciated from FIG. 1, the connection 25 between the LP compressor shaft 23 and the LP drive shaft 24 (and thus the LP turbine 21) is located relatively far inside the engine, thereby rendering access to this connection difficult for engine maintenance, primarily in cases where modularity must be maintained for on-wing hot section inspection (HSI).

To address this issue, it is herein proposed to install the RGB 31 in an offset or off-centered position relative to the engine main axis 17 and the LP compressor shaft 22. From FIG. 1, it can be appreciated that the RGB 31 is radially offset from the LP compressor shaft 23 by a distance sufficient to provide axial access to the LP compressor shaft 23 via the hollow LP turbine shaft 24. To this end, a front access port 37 is defined in a front facing surface of the engine casing C. The access port 37 is axially aligned with the LP compressor and the LP turbine shafts. In the illustrated embodiment, the access port 37 is positioned below the RGB 31 and is selectively openable to provide access to the connection 25 via the bore of the LP turbine shaft 24. The offset RGB 31 engine architecture together with the access port facilitate access to the connection between the LP turbine shaft 24 and the LP compressor shaft 23.

The offset RGB 31 can be of many different types (all spur gears, spur+planetary, bevel gears, etc.). In the illustrated embodiment, the LP turbine shaft 24 carries at its front end an output gear 38. The output gear 38 is in meshing engagement with an input gear 31a of the RGB 31. The RGB input gear 31a is mounted for rotation about an axis 31b which is parallel but radially offset from the LP turbine shaft 24. As schematically shown in FIG. 1, the input gear 31a may be drivingly connected to an intermediate gear set having an output axis 31c which is disposed further radially away from the LP turbine shaft 24. The intermediate gear set may comprise a first intermediate gear 31d mounted for rotation about the axis 31b of the input gear 31a and a second intermediate gear 31e mounted for rotation about the output axis 31c of the RGB 31 coaxially with the propeller shaft 35. Various configurations and gear set arrangements are contemplated.

The LP turbine shaft 24 extending forward of the LP turbine 21 and the LP compressor shaft 23 extending aft of the LP turbine 21 provide the engine 10 with bidirectional drive. In light of the preceding, it can be appreciated that the LP turbine 21 drives both the rotatable load and the LP compressor 22. Furthermore, the rotatable load, when mounted to the engine 10, and the LP compressor 22 are disposed on opposite ends of the LP turbine 21. It can thus be appreciated that one or more low pressure turbines are used to drive elements in front of the low pressure turbines (e.g. propeller 16, RGB 31, etc.) as well as to drive elements to the rear of the low pressure turbines (e.g. LP compressor 22). This configuration of the LP turbine 21 allows it to simultaneously drive the rotatable load and the LP compressor 22, if desired. As will be discussed in greater detail below, this arrangement of the rotatable load, the LP turbine 21, and the LP compressor 22 can contribute to improving the thermodynamic efficiency of the engine 10.

Still referring to FIG. 1, the HP spool of the engine 10 is provided with at least one component to compress the air that is part of the compressor section 12, and at least one component to extract energy from the combustion gases that is part of the turbine section 14. The HP spool 40 is also disposed along the axis 17 and includes an HP turbine 41 drivingly connected to an HP compressor 42 by an HP shaft 43 rotating independently of the LP compressor shaft 23. Similarly to the LP turbine 21 and the LP compressor 22, the HP turbine 41 and the HP compressor 42 include axial rotary components. They can also each include one or more stages of rotors and stators, depending upon the desired engine thermodynamic cycle, for example. In the depicted embodiment, the HP compressor 42 includes a centrifugal compressor 42A or impeller and an axial compressor 42B, both of which are driven by the HP turbine 41. During operation of the engine 10, the HP turbine 41 drives the HP compressor 42.

The HP turbine 41 is aft of the LP turbine 21, and forward of the combustor 13. The HP compressor 42 is aft of the combustor 13, and forward of the LP compressor 22. From this arrangement of the HP turbine 41 and the HP compressor 42, it can be appreciated that during operation of the engine 10, the LP compressor section driven by the LP turbine 21 feeds pressurized air to the HP compressor 42. Therefore, the pressurized air flow produced by the LP compressor 22 is provided to the HP compressor 42 and contributes to the work of both the LP turbine 21 and the HP turbine 41.

It can thus be appreciated that the presence of the above-described LP and HP spools provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

In light of the preceding, it can be appreciated that the LP turbine 21 is the "low-speed" and "low pressure" turbine section when compared to the HP turbine 41. The LP turbine 21 is sometimes referred to as a "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22.

The HP turbine 41 and the HP compressor 42 can have any suitable mechanical arrangement to achieve the above-described split compressor functionality. For example, and as shown in FIG. 1, the HP spool includes a high pressure shaft 43 extending between the HP compressor 42 and the HP turbine 41. The HP shaft 43 is coaxial with the LP pressure compressor shaft 23 and rotatable relative thereto. The relative rotation between the HP shaft 43 and the LP compressor shaft 23 allow the shafts 23,43 to rotate at different rotational speeds, thereby allowing the HP compressor 42 and the LP compressor 22 to rotate at different rotational speeds. The HP shaft 43 can be mechanically supported by the LP compressor shaft 23 using bearings or the like. In the depicted embodiment, the LP compressor shaft 23 is at least partially concentrically disposed within the HP shaft 43.

Still referring to the embodiment shown in FIG. 1, the engine 10 also includes an accessory gearbox 50. The accessory gearbox 50 (sometimes referred to herein simply as "AGB 50") receives a rotational output and in turn drives accessories (e.g. fuel pump, starter-generator, oil pump, scavenge pump, etc.) that contribute to the functionality of the engine 10. The AGB 50 can be designed with side-facing accessories, top-facing accessories, or rear-facing accessories depending on the installation needs. The AGB 50 is aft of the air inlet 11. According to the illustrated embodiment, the AGB 50 is also coaxial to the engine axis 17.

The engine 10 may also have a tower shaft 51 that is mechanically coupled to a rear of the HP shaft 43 and driven thereby. An accessory gear box drive shaft 52 has a first geared end 52A mechanically coupled to the tower shaft 51, and a second geared end 52B mechanically coupled to the AGB 50. During operation of the engine 10, the HP shaft 43 transmits a rotational drive to the tower shaft 51, which, in turn, drives the accessory gearbox drive shaft 52 to thereby drive the accessories of the AGB 50. In the depicted embodiment, the accessory gearbox drive shaft 52 extends across the air inlet 11. This configuration of the accessory gearbox drive shaft 52 can take different forms. For example, it can be located outside the air inlet 11, or may be placed within the air inlet 11 along a strut of the air inlet 11. It can thus be appreciated that the second end 52B of the accessory gearbox drive shaft 52 meshes with an input gear of the AGB 50 to drive the AGB 50 across the air inlet 11.

Referring to FIG. 1, there is also disclosed a method of operating the gas turbine engine 10. Air is drawn into the engine core of the engine 10 via the air inlet 11 with the LP compressor 22. The air from the LP compressor 22 is further pressurized by the HP compressor 42 disposed forward of the LP compressor 22. The air is mixed with fuel and ignited in the combustor 13 to generate combustion gases. The HP compressor 42 is driven by the HP turbine 41 disposed forward of the combustor 13 to extract energy from the combustion gases. The LP compressor 22 is driven by the LP turbine 21 disposed forward of the HP turbine 41. The LP turbine shaft 24 and rotatable load are driven by the LP turbine 21, and are located forward of the LP turbine 21.

It can thus be appreciated that at least some of the embodiments of the engine disclosed herein provide a mechanical architecture of turbomachinery that allows for a split compressor system. Such a split compressor reverse-flow engine may be used for aircraft nose installations, as well as for wing installations.

The above description is meant to be exemplary only, and one skilled in the art will recognize that changes may be made to the embodiments described without departing from the scope of the invention disclosed. For example, although the engine shown in FIG. 1 is a turboprop engine, it will be appreciated that the engine could be configured as a turboshaft engine as well. Still other modifications which fall within the scope of the present invention will be apparent to those skilled in the art, in light of a review of this disclosure, and such modifications are intended to fall within the appended claims.

The invention claimed is:

1. A turboshaft or turboprop engine comprising: an engine case housing a low pressure spool including a low pressure compressor drivingly connected to a low pressure turbine by a low pressure compressor shaft extending along an engine axis, the low pressure turbine disposed forward of the low pressure compressor, the low pressure spool further including a low pressure turbine shaft drivingly connected to the low pressure turbine and extending forward of the low pressure turbine, a mechanical connection between the low pressure turbine shaft and the low pressure compressor shaft, a reduction gear box (RGB) drivingly connected to the low pressure turbine shaft forward of the low pressure turbine, the RGB mounted to an axially forwardly facing surface of the engine case in a position radially offset from the engine axis by a distance sufficient to provide axial access to the low pressure compressor shaft inside the engine case, the RGB having an input axis radially offset from the engine axis, and an access port defined in the axially forwardly facing surface of the engine case aft of the RGB, the access port disposed axially in-line with the engine axis and selectively openable and closable between a closed position in which the low pressure compressor shaft is fully axially concealed behind the closed access port and an open position to provide axial access to the mechanical connection while the RGB is still mounted to the axially forwardly facing surface of the engine case.

2. The turboshaft or turboprop engine defined in claim 1, wherein the low pressure compressor shaft concentrically extends into the low pressure turbine shaft, the mechanical connection of the low pressure compressor shaft accessible via the access port through the low pressure turbine shaft.

3. The turboshaft or turboprop engine defined in claim 1, further comprising a high pressure compressor drivingly connected to a high pressure turbine via a high pressure shaft, the high pressure compressor disposed forward of the low pressure compressor and in fluid flow communication therewith to receive pressurized air therefrom, the high pressure turbine disposed aft of the low pressure turbine and in fluid communication therewith.

4. The turboshaft or turboprop engine as defined in claim 3, further comprising an accessory gearbox (AGB) disposed aft of the low pressure compressor axially in-line with the engine axis.

5. The turboshaft or turboprop engine as defined in claim 4, wherein an air inlet is disposed between the low pressure compressor and the AGB.

6. The turboshaft or turboprop engine defined in claim 1, wherein the RGB has an output shaft drivingly connected to a rotatable load selected from a group consisting of: a propeller, a helicopter rotor and a generator.

7. The turboshaft or turboprop engine defined in claim 1, wherein the low pressure compressor shaft is drivingly connected to the low pressure turbine via the low pressure turbine shaft.

8. The turboshaft or turboprop engine as defined in claim 1, wherein an output gear is provided at a forward end of the low pressure turbine shaft in meshing engagement with an input gear of the RGB, the input gear mounted for rotation about the input axis of the RGB.

9. The turboshaft or turboprop engine as defined in claim 1, wherein the low pressure compressor shaft is concentrically disposed relative to the engine axis.

10. A turboprop or turboshaft engine comprising: an engine case; an output drive shaft having a front end configurable to drivingly engage a rotatable load; a low pressure (LP) turbine having an LP turbine shaft drivingly connected to the output drive shaft via a reduction gear box (RGB), an LP compressor drivingly connected to the LP turbine via an LP compressor shaft, the LP turbine disposed forward of the LP compressor; a mechanical connection between the LP compressor shaft and the LP turbine shaft, the mechanical connection disposed axially between the RGB and the LP turbine; a high pressure (HP) turbine drivingly connected to an HP compressor via an HP shaft, the HP compressor disposed forward of the LP compressor and in fluid communication therewith for receiving pressurized air therefrom, the HP turbine disposed aft of the LP turbine and in fluid communication therewith; wherein the RGB is mounted to a front face of the engine case in a position radially offset from the LP compressor shaft to provide axial access thereto via a front end of the turboprop or turboshaft engine, and wherein an access port is provided in the front face of the engine case, the access port being axially aligned with the LP compressor shaft and offset relative to the RGB, the access port selectively openable and closable between a closed position in which the LP compressor shaft is fully axially concealed behind the closed access port and an open position providing axial access to the mechanical connection while the RGB is still mounted to the engine case.

11. The turboshaft or turboprop engine as defined in claim 10, further comprising an accessory gearbox (AGB) disposed aft of the LP compressor and in axial alignment therewith.

12. The turboshaft or turboprop engine as defined in claim 10, wherein the LP compressor shaft extends coaxially into the LP turbine shaft, the LP compressor shaft axially accessible via the LP turbine shaft.

13. The turboshaft or turboprop engine as defined in claim 12, wherein the LP turbine shaft carries an output gear, which is in meshing engagement with an input gear of the RGB, the input gear of the RGB having an output axis that is off-centered relative to the LP turbine shaft.

14. The turboshaft or turboprop engine as defined in claim 10, wherein the LP turbine shaft projects axially forwardly from a forward side of the LP turbine, the access port providing access to an axially extending bore of the LP turbine shaft, the LP compressor shaft accessible via said axially extending bore.

15. The turboshaft or turboprop engine as defined in claim 14, wherein the mechanical connection between the LP compressor shaft and the LP turbine shaft is provided in the axially extending bore, the access port providing access to the mechanical connection.

* * * * *